US006394900B1

(12) United States Patent
McGlone et al.

(10) Patent No.: US 6,394,900 B1
(45) Date of Patent: May 28, 2002

(54) SLOT REEL PERIPHERAL DEVICE WITH A PERIPHERAL CONTROLLER THEREIN

(75) Inventors: James T. McGlone; Steven G. LeMay; Wesley F. Carmean, all of Reno, NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/478,269

(22) Filed: Jan. 5, 2000

(51) Int. Cl.[7] ................................................ A63F 13/00

(52) U.S. Cl. ............................ 463/20; 463/16; 463/21; 463/22; 463/47; 273/142 R

(58) Field of Search ............................... 463/1, 16, 20, 463/21, 42, 43, 46, 47, 22; 273/138.1, 138.2, 139, 143 G, 142 R

(56) References Cited

U.S. PATENT DOCUMENTS

| | | | | |
|---|---|---|---|---|
| 4,648,063 A | * | 3/1987 | Strout | 364/900 |
| 5,074,559 A | * | 12/1991 | Okada | 273/143 R |
| 5,169,147 A | * | 12/1992 | Hamano | 273/138 |
| 5,379,382 A | * | 1/1995 | Work et al. | 395/275 |
| 5,643,086 A | | 7/1997 | Alcorn et al. | 463/29 |
| 5,708,838 A | * | 1/1998 | Robinson | 395/800 |
| 5,761,647 A | | 6/1998 | Boushy | 705/10 |
| 5,785,595 A | * | 7/1998 | Gauselmann | 463/20 |
| 5,839,957 A | * | 11/1998 | Schneider et al. | 463/20 |
| 5,938,196 A | * | 8/1999 | Antoja | 273/143 C |
| 5,938,529 A | * | 8/1999 | Rodesch et al. | 463/20 |
| 5,958,020 A | * | 9/1999 | Evoy et al. | 710/3 |
| 6,003,867 A | * | 12/1999 | Rodesch et al. | 463/20 |
| 6,068,552 A | * | 5/2000 | Walker et al. | 463/21 |
| 6,104,815 A | | 8/2000 | Alcorn et al. | 380/251 |
| 6,106,396 A | | 8/2000 | Alcorn et al. | 463/29 |
| 6,117,010 A | * | 9/2000 | Cantertbury et al. | 463/20 |
| 6,135,887 A | * | 10/2000 | Pease et al. | 463/42 |
| 6,149,522 A | | 11/2000 | Alcorn et al. | 463/29 |
| 6,203,430 B1 | * | 3/2001 | Walker et al. | 463/20 |

OTHER PUBLICATIONS

Superior Electric, Slo–Syn SC Stepping Motors, 1985.*
Superior Electric motion control advetisement, Electronics Magazine Aug. 21, 1986.*
Superior Electric, Step Motor Control and Load Interaction ina Step Motor System, 1980.*
Schematic illustration of "Wheel of Fortune II" slot machines publically available prior to Dec. 1999.

* cited by examiner

*Primary Examiner*—Jessica J. Harrison
*Assistant Examiner*—John M Hotaling, II
(74) *Attorney, Agent, or Firm*—Beyer Weaver & Thomas, LLP

(57) ABSTRACT

A disclosed slot reel peripheral has a slot reel, a drive mechanism and a peripheral controller. Using a standard communication protocol such as USB (Universal Serial Bus), the peripheral controller is configured to communicate with one or more master gaming controllers or other slot reel peripherals via a peripheral connection. The peripheral controller may drive the slot reel from position to position by operating the drive mechanism and may send operating instructions to other slot reel peripherals with peripheral controllers. Further, the peripheral controller may control one or more specialized "peripheral devices" (e.g., effects lights, back lights, bar code detectors, tampering sensors, position sensors, sound devices, electro-luminescent devices and stepper motors, etc. that perform specific functions of the slot reel peripheral).

32 Claims, 9 Drawing Sheets

SLOT REEL PERIPHERAL DEVICE WITH A PERIPHERAL CONTROLLER THEREIN

CROSS REFERENCE TO RELATED APPLICATIONS

This application is related to U.S. patent application Ser. No. 09/414,659 filed on Oct. 6, 1999, naming Stockdale and LeMay as inventors and titled "STANDARD PERIPHERAL COMMUNICATION."

BACKGROUND OF THE INVENTION

This invention relates to gaming peripherals for gaming machines such as slot machines. More particularly, the present invention relates to slot reels as gaming peripherals for gaming machines.

There are a wide variety of associated devices that can be connected to or serve as part of a gaming machine such as a slot machine. These devices provide gaming features that define or augment the game(s) played on the gaming machine. Some examples of these devices are slot reels, lights, ticket printers, card readers, speakers, bill validators, coin acceptors, display panels, key pads, and button pads. Many of these devices are built into the gaming machine. Often, a number of devices are grouped together in a separate box that is placed on top of the gaming machine. Devices of this type are commonly called a top box.

Typically, the gaming machine controls various combinations of devices. The features of a given device, including slot reels, are usually controlled by a "master gaming controller" within the gaming machine. For example to control a slot reel during a game, the master gaming controller might perform many different operations including instructing a stepper motor on the slot reel to spin and then stop at a certain position, instructing lights on the slot reel to go on and off in various patterns, or instructing a speaker connected to the slot reel to emit various sound patterns. For the master gaming controller to perform these operations, connections from the slot reel are wired directly into some type of electronic board (e.g., a "back plane" or "mother board") containing the master gaming controller.

The components of a slot reel might include a reel of certain size, a reel strip indicating positions on the reel, a position sensor, a stepper motor, tampering sensors, a back light and an effects light. Parameters and operation features for each of these components must be known to the master gaming controller to operate a particular slot reel. The required information is incorporated into software and stored in some type of memory device on the master gaming controller. This slot reel specific software operates the features of the device during a game. Typically, the software is executed by a microprocessor located on the master gaming controller. As an example, to operate a slot reel, the development of the software for the master gaming controller may consider information such as the moment of inertia of the slot reel, the number of positions on the reel strip, the type of stepper motor, features of the stepper motor, signals that correspond to each feature on the stepper motor, and the response time of the stepper motor.

Traditionally, the master gaming controller has performed all game functions including the calculation of the game outcome, coin handling, communications with external devices, lighting control, operation of the slot reels, etc. for the slot machine. As the slot machine has evolved, the features offered to players have become more complex and the potential combinations of gaming devices available to a gaming machine has increased. For example, video animations, combined with digital audio have been added to the basic game play of the spinning reel slot machine. To execute these complex game features and perform all of the game functions, a microprocessor with significant computational capabilities is required. Further, to accommodate all of the gaming devices within the gaming machine, the motherboard containing the microprocessor must have the necessary circuitry and wiring needed to communicate with the all of the devices operated by the master gaming controller. In the past instead of designing one motherboard that could accommodate communications with all of the potential gaming devices, a number of different motherboards were designed, each accommodating communications with some subset of the available gaming devices.

Disadvantages of the current slot machine architecture include the following. First, the number of types of motherboards needed to accommodate all of the potential combinations of gaming devices has become large. Second, the computational capabilities of the motherboard needed to drive all the devices has become large. Third, when devices are added to augment the features of the gaming machine or when devices are replaced for maintenance the steps necessary to rewire the device onto the motherboard and load the appropriate software onto the motherboard can be time consuming and require significant shutdown time for the gaming machine. Accordingly, it would be desirable to provide slot reels that are compatible with a standard communication protocol and/or connection system for installing or removing devices controlled by a master gaming controller. A slot reel gaming peripheral that is compatible with a standard communication protocol and/or connection system may reduce the number of types of motherboards that are needed for the gaming machine and may reduce the amount of maintenance time when a slot reel is replaced. Further, it would be desirable to have the slot reel gaming peripheral control some of its own functions rather than having all the functions controlled by the master gaming controller. This feature might reduce the load on the computational resources of the master gaming controller.

SUMMARY OF THE INVENTION

This invention addresses the needs indicated above by providing a slot reel peripheral having a slot reel, a drive mechanism and a peripheral controller. Using a standard communication protocol such as USB (Universal Serial Bus), the peripheral controller is configured to communicate with one or more master gaming controllers or other slot reel peripherals via a peripheral connection. The peripheral controller may drive the slot reel from position to position by operating the drive mechanism and may send operating instructions to other slot reel peripherals with peripheral controllers. Further, the peripheral controller may control one or more specialized "peripheral devices" (e.g., effects lights, back lights, bar code detectors, tampering sensors, position sensors, sound devices, electro-luminescent devices and stepper motors, etc. that perform specific functions of the slot reel peripheral).

One aspect of the present invention provides a slot reel peripheral that generally can be characterized as including (1) a drive mechanism, (2) a single slot reel that may be moved from position to position by the drive mechanism, (3) a peripheral controller that directly controls the drive mechanism and (4) a peripheral communication connection for connecting the peripheral controller to a master gaming controller. The drive mechanism controlled by the peripheral controller may be a stepper motor. Further, the peripheral controller may control a number of peripheral devices associated with the slot reel peripheral including effects lights, position sensors, bar code detectors, back lights, tampering sensors, sound devices and electro-luminescent devices. The peripheral controller may be connected to one or more of the peripheral devices via a peripheral interface. The peripheral controller includes a memory storing software for a communication protocol that allows communication with the peripheral devices via the peripheral interface.

In preferred embodiments, the peripheral controller includes a control microprocessor that controls communication over the peripheral communication connection. Also, the slot reel peripheral may include a hub comprising a number of peripheral communication connections. Through one or more of these peripheral connections the peripheral controller may communicate with other slot reel peripherals. The peripheral controller may have a non-volatile memory arranged to store configuration parameters specific to the slot reel peripheral and state history information of the slot reel peripheral. In one embodiment, the non-volatile memory might be used to store the configuration parameters needed to drive the slot reel using the drive mechanism including a moment of inertia of the slot reel, the size of the slot reel and one or more acceleration parameters.

Another aspect of the present invention provides a gaming machine that can generally be characterized as including (1) a master gaming controller that controls one or more games played on the gaming machine and (2) at least one slot reel peripheral. The slot reel peripheral should include (a) a drive mechanism, (b) a single slot reel that is moved from position to position by the drive mechanism, (c) a peripheral controller that directly controls the drive mechanism and (d) a peripheral communications connection connecting the peripheral controller to the master gaming controller. In preferred embodiments, the master gaming controller includes a memory storing software for (i) standard device identification protocol for at least some of the slot reel peripherals, (ii) device drivers for at least some of the slot reel peripherals and (iii) a communication protocol that allows communication with the slot reel peripherals via the peripheral communications connection. Further, the slot reel peripheral includes a memory storing software for a communication protocol that allows communication with the master gaming controller via the peripheral communication connection. As described above, the gaming machine may be a video slot machine.

In preferred embodiments, the slot reel peripheral may be configured to receive high-level instructions from the master gaming controller that do not specify precise control of the drive mechanism of the slot reel peripheral. Following the highlevel instructions, the peripheral controller of the slot reel peripheral receiving the high-level instructions may provide low-level instructions precisely controlling the operation of its drive mechanism. Further, one slot reel peripheral may be configured to send high-level instructions that do not specify precise control of the drive mechanism to a second slot reel peripheral. Following the high-level instructions, the peripheral controller of the second slot reel peripheral receiving the high-level instructions may provide low-level instructions precisely controlling the operation of its drive mechanism.

Another aspect of the present invention provides a gaming machine network including a slot reel peripheral and a plurality of gaming machines. The slot reel peripheral should include a drive mechanism and a single slot reel that is moved from position to position by the drive mechanism. Each gaming machine should include a master gaming controller that controls the slot reel peripheral and a peripheral communication connection configured to communicate with the slot reel peripheral. The slot reel peripheral may be configured to receive high-level instructions from the plurality of master gaming controllers that do not specify precise control of the drive mechanism of the slot reel peripheral. Following the high-level instructions, the peripheral controller of the slot reel peripheral may provide low-level instructions precisely controlling the operation of its drive mechanism.

Another aspect of the present invention provides a method for controlling operation of a slot reel peripheral containing a single slot reel on a gaming machine. The method may include the steps of (1) receiving a high level instruction for controlling the slot reel peripheral from a first master gaming controller via a standard peripheral connection to a peripheral controller associated with the slot reel peripheral where the high level instruction does not precisely specify how the slot reel peripheral must perform an operation associated with the high level instruction, (2) converting the high level instruction to one or more low level operating instructions, at the peripheral controller, for controlling the operation of one or more peripheral devices provided with the slot reel peripheral and (3) controlling operation of the one or more peripheral devices with the low level operating instructions. In the a preferred embodiment, the method may also include the steps of (a) storing state history information in the slot reel peripheral specifying a recent operating state of the slot reel peripheral and (b) transmitting the stored state history information to the first master gaming controller. In another embodiment the slot reel peripheral may receive a high level instruction for controlling the slot reel peripheral from a second slot reel peripheral via a standard peripheral connection or from a second master gaming controller different from the first master gaming controller.

These and other features of the present invention will be presented in more detail in the following detailed description of the invention and the associated figures.

DESCRIPTION OF THE PREFERRED EMBODIMENTS

Figure 1A:
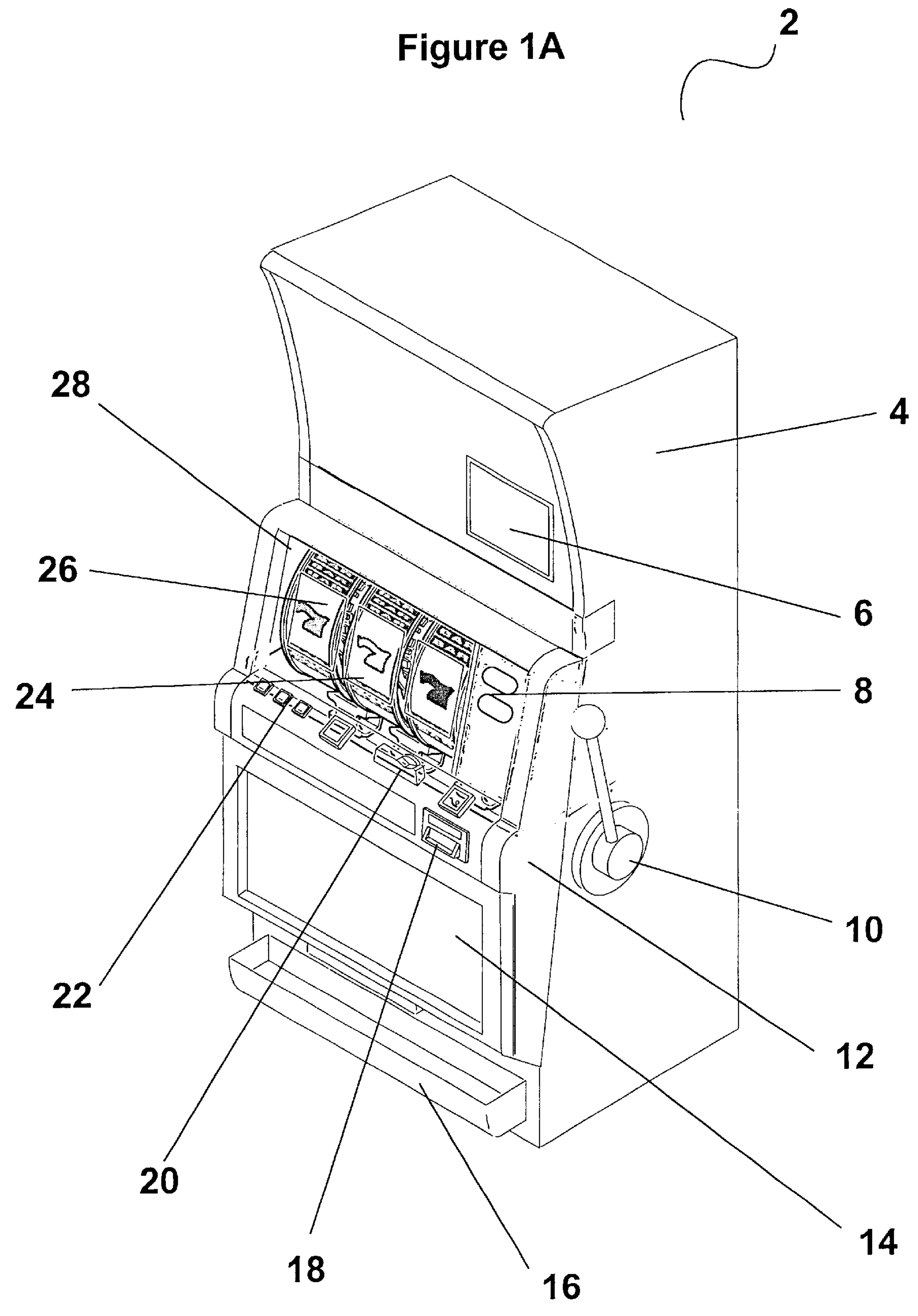
FIG. 1A is a perspective drawing of a gaming machine having a set of slot reels and other devices.

Turning first to FIG. 1A, a video gaming machine 2 of the present invention is shown. The gaming machine 2 includes a main cabinet 4, which generally surrounds the machine interior (not shown) and is viewable by users. The main cabinet includes a main door 12 on the front of the machine, which opens to provide access to the interior of the machine. Typically, the main door 12 and/or any other portals which provide access to the interior of the machine utilize a locking mechanism of some sort as a security feature to limit access to the interior of the gaming machine. Attached to the main door are player-input switches 22, a coin acceptor 20, and a bill validator 18, a coin tray 16, and a belly glass 14. Viewable through the main door is three slot reel assemblies 24. Each slot reel assembly is covered with a reel strip 32. The reel strip 32 is covered with various symbols that are displayed during the course of a game being played on the slot machine. The reel assemblies are behind a display panel 26 of some type. Above the main door is a video display monitor 6. The display monitor 6 will typically be a cathode ray tube, high resolution flat-panel LCD, or other conventional electronically controlled video monitor. The display monitor may add additional features to the game being played on the slot machine. Next to the reel assemblies is an information panel 8. The information panel 8 is a back-lit silk screened glass panel with lettering to indicate general game information including, for example, the number of coins played. On the side of the gaming machine is a slot reel handle 10. The slot reel handle 10 may be used by a player to activate the slot reels 24 during the course of a game. The bill validator 18, player-input switches 22, video display monitor 6, slot reel handle 10 and information panel 8 are devices used to play a game on the gaming machine 2. The devices are controlled by circuitry (not shown) housed inside the main cabinet 4 of the machine 2. Many possible types of slot machine games maybe provided with gaming machines of this invention.

When a user wishes to play the gaming machine 2, he or she inserts cash through the coin acceptor 20 or bill validator 18. At the start of the game, the player may initiate game play by pulling the slot reel handle 10 on the side of the gaming machine or by pressing one of the player input switches 22. During the game, the player may view additional game information and be presented with additional game options using the video display 6. Usually, during the course of a game, a player is required to make a number of decisions, which affect the outcome of the game. The player makes these choices using the player-input switches 22. During certain game events, the gaming machine 2 may display visual and auditory effects that can be perceived by the player. These effects add to the excitement of a game, which makes a player more likely to continue playing. Auditory effects include various sounds that are projected by the speakers (not shown). Visual effects include flashing lights, strobing lights or other patterns displayed from lights on the gaming machine 2 including lights behind the belly glass 14, from patterns on the video display 6, or from lights on the reel assemblies 24. After the player has completed a game, the player may receive game tokens from the coin tray 16 which may be used for further games.

Figure 1B:
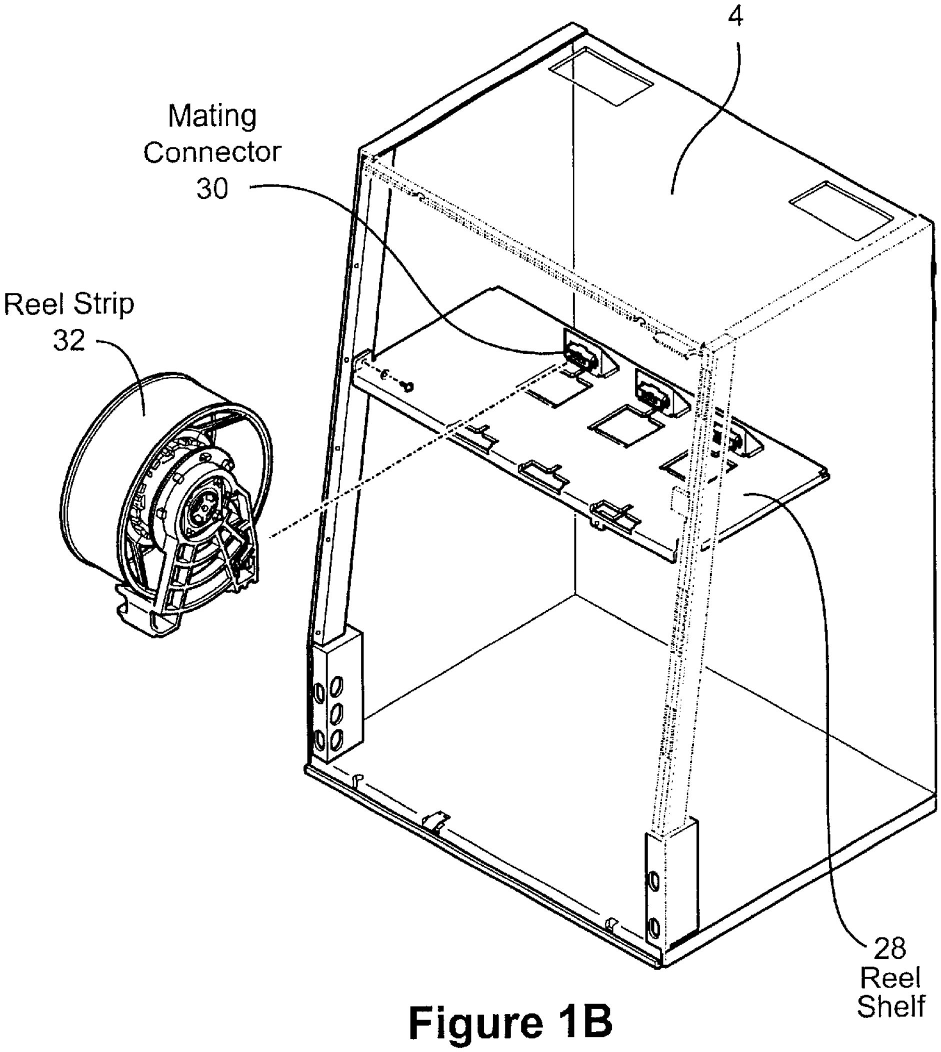
FIG. 1B is a perspective drawing of a gaming machine cabinet and slot reel assembly.

FIG. 1B is a perspective drawing of a gaming machine cabinet and slot reel assembly. The main cabinet 4 contains a reel shelf 28 which usually supports three reel assemblies 24. The reel assembly 24 contains a reel strip 32. The reel strip 32 will usually be covered with a number of symbols which are utilized during the game play. Each reel assembly 24 is usually plugged into a mating connector 30. The mating connector usually contains connections to a power source needed to operate the reel assembly 24 and communication connections to circuitry (not shown) housed within the main cabinet 4 of the machine 2. During a game, the reel assembly and its associated devices may be controlled, in part, by the circuitry within the main cabinet of the gaming machine and by peripheral control circuitry (not shown) located within the reel assembly.

Figure 1C:
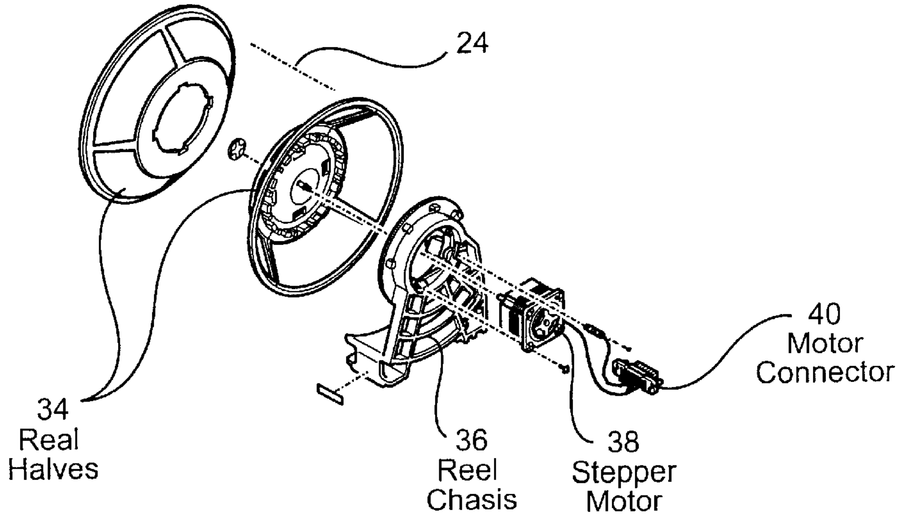
FIG 1C is an exploded perspective drawing of the interior parts of a slot reel assembly.

FIG 1C is an exploded perspective drawing of the interior parts of a slot reel assembly. The reel is composed of two reel halves 34. The reel strip 32 is placed around the edges of the reel halves. The moment of inertia of the reel halves—which is a function of parameters including their diameter, shape, and material composition—is an important operational parameter of the reel assembly 24. The reel halves are supported by a reel chassis 36 which maybe mounted to the reel shelf 28 shown in FIG. 1B. Before a player initiates a game, each reel assembly is usually motionless with each symbol on the reel strip in some initial position. When the player initiates a game, the each reel may be set in a rotating motion by a stepper motor 38 mounted on the reel chassis 36 and connected to the reel halves 34. The stepper motor 38 accelerates the reel halves 34 to a certain angular velocity and then stops the reel halves at some predetermined position. The position of the reel strip on each of the reel assemblies 24 may determine the outcome of the game initiated by the player.

Figure 2:
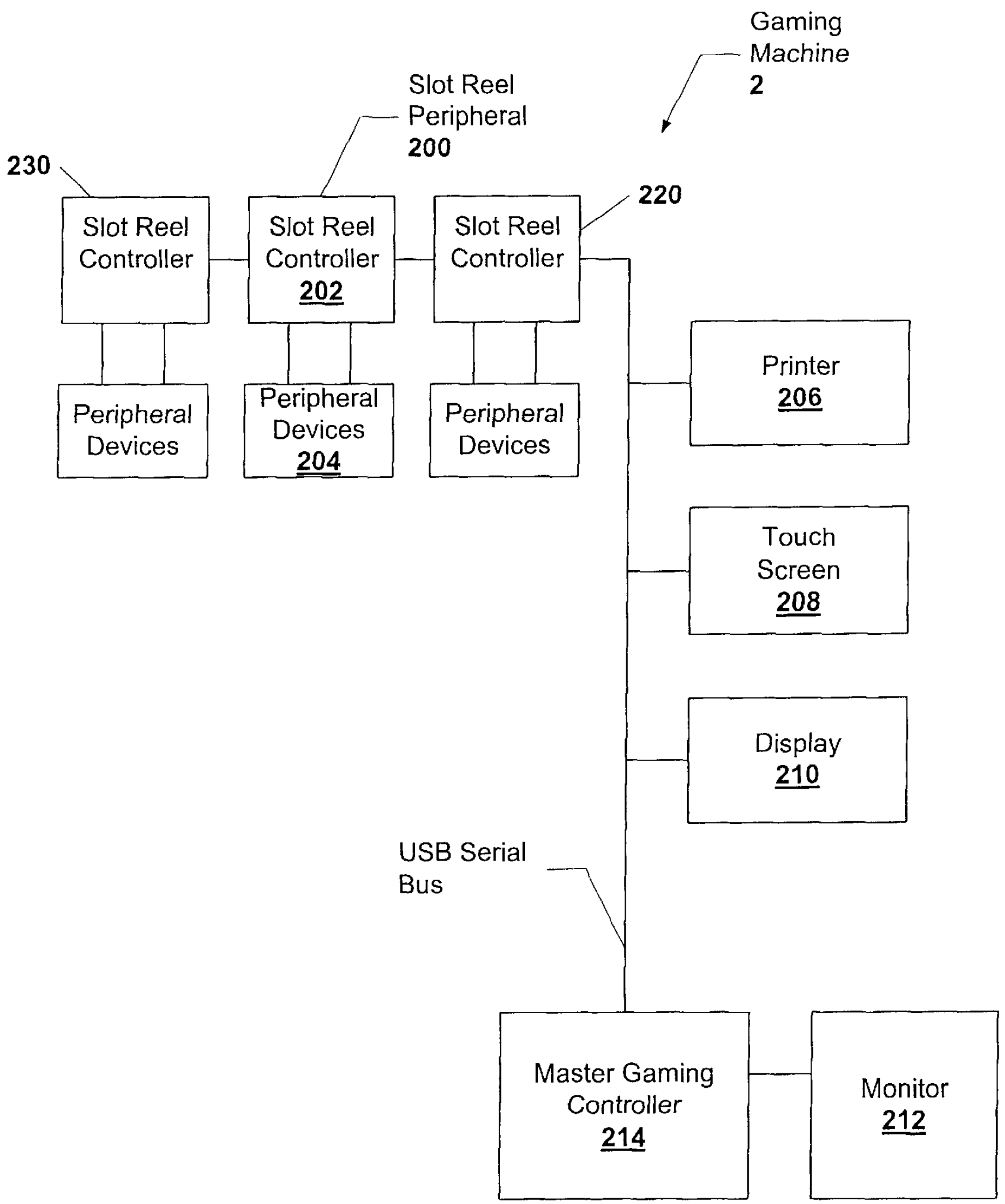
FIG. 2 is a block diagram depicting a slot reel gaming peripheral and its connection over a communication network to a master gaming controller in accordance with this invention.

FIG. 2 is a block diagram depicting a slot reel gaming peripheral and its connection over a communication network to a master gaming controller in accordance with this invention. When a gaming machine 2 is operating, the master gaming controller 214 may communicate with a variety of gaming devices. This communication may be carried out using some type of standard communication protocol including a USB serial bus using a standard connection system 216. Details of the USB communication protocol and connection system will be described below with reference to FIGS. 5, 6, 7 and 8.

During a game, the master gaming controller 214 may control devices including a monitor printer 206, a touch screen 208, a display 210, a monitor 212, or a slot reel peripheral 200. Using the standard communication connections and the standard communication protocol, the master gaming controller 214 may send instructions to a device to perform a specific operation. These instructions may be in the form of low-level or high-level instructions. The master gaming controller 214 sends low-level instructions to devices that it directly controls. Examples of low-level instructions might include turning on a specific light, turning off a specific light, starting a motor, or stopping a motor. The master gaming controller may send highlevel instructions to the slot reel peripheral 200 (e.g., stop at the lemon symbol). The slot reel peripheral 200 is a device that contains, for example, a standard communication connection, a peripheral or slot reel controller 202, and connections to one or more peripheral devices on the slot reel. The slot reel controller 202 contains a microprocessor which may enable it to directly perform some operations based on the high-level instructions from the master gaming controller 214. Typically, the slot reel controller 202 controls one or more peripheral devices on the slot reel 204. For example the slot reel controller might control the stepper motor shown in FIG. 1C. Further, the slot reel peripheral 200 may be configured to control other reel peripherals including the slot reel peripherals 220 and 230 so that the three slot reel peripherals may operate as one unit when receiving commands from the master gaming controller 214. Also, when the communication connections and the standard communication protocol are used, the slot reel controller 204 enables communication between the master gaming controller 214 and one or more peripheral devices on the slot reel 204.

Figure 3:
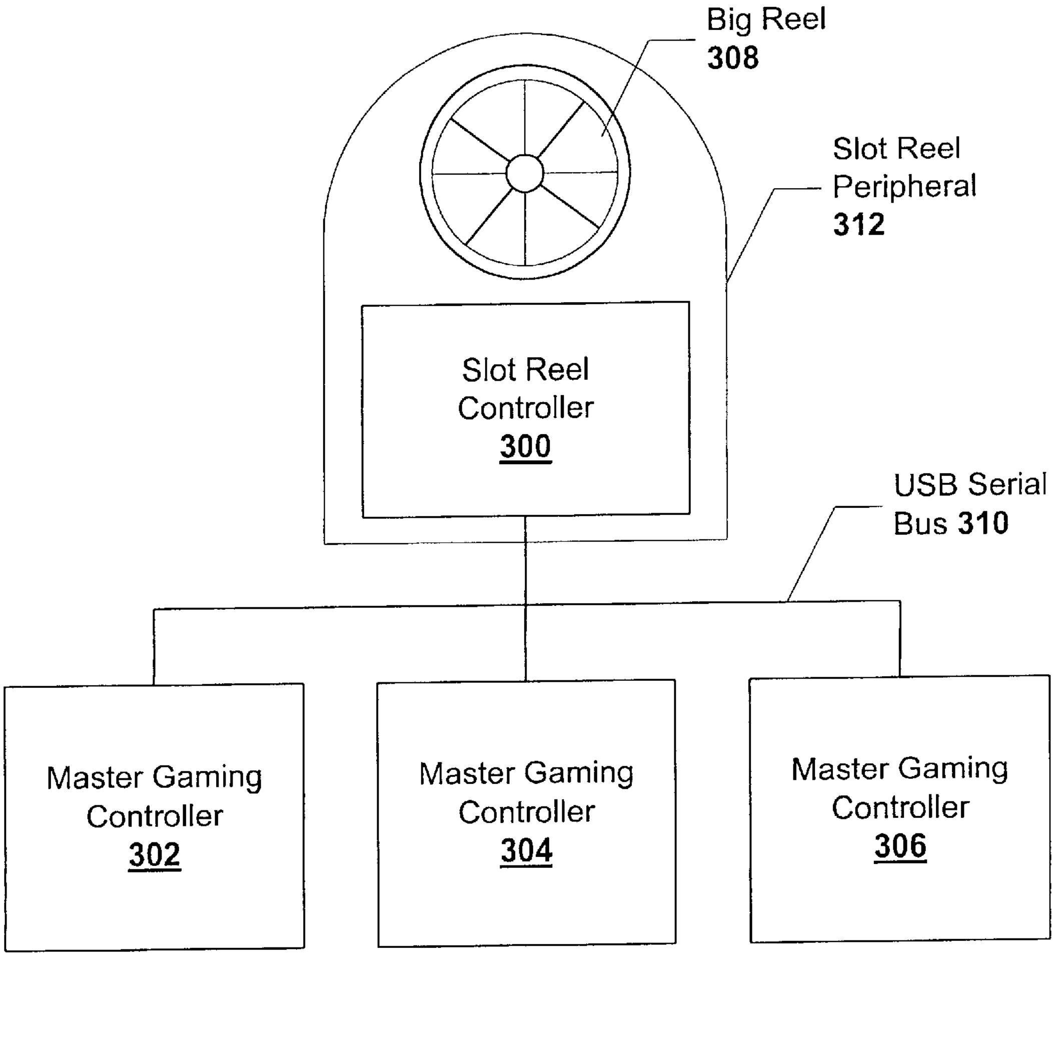
FIG. 3 is a block diagram depicting a slot reel gaming peripheral and its connection over a communication network to a plurality of master gaming controllers in accordance with this invention.

FIG. 3 is a block diagram depicting a specific embodiment in which a slot reel gaming peripheral is connected over a communication network to a plurality of master gaming controllers in accordance with this invention. The master gaming controllers 302, 304, 306 are connected over a communication network 310 including a USB serial bus to the slot reel peripheral 312. Each master gaming controller may reside in a separate gaming machine. The slot reel peripheral 313 contains a reel controller 300 which may control one or more peripheral devices in the slot reel peripheral 312 including the big reel 308. During the course of game played on any of the gaming machines containing the master gaming controllers 302, 304, 306, the slot reel peripheral 312 might be operated from instructions sent by one or more of the master gaming controllers. For example, during certain game situations for games controlled by the master gaming controllers, one of the master gaming controllers might send a command to the slot reel controller 300 within the slot reel peripheral instructing the big reel 308 to spin and then stop at a certain position. This instruction might be in the form of low-level instructions sent directly to the big reel 308 or as high-level instructions sent to the slot reel controller 300. These instructions might be sent when a bonus situation occurs during one the games being played on the gaming machines connected to the slot reel peripheral 312. Since the slot reel peripheral 312 may be shared by a plurality of gaming machines, the slot reel peripheral might be viewable by players playing games on all of these gaming machines connected to the slot reel peripheral. Further, the big reel 308 might be activated by combinations of game events occurring simultaneously on the different gaming machines controlled by the master gaming controllers 302, 304, 306.

Figure 4:
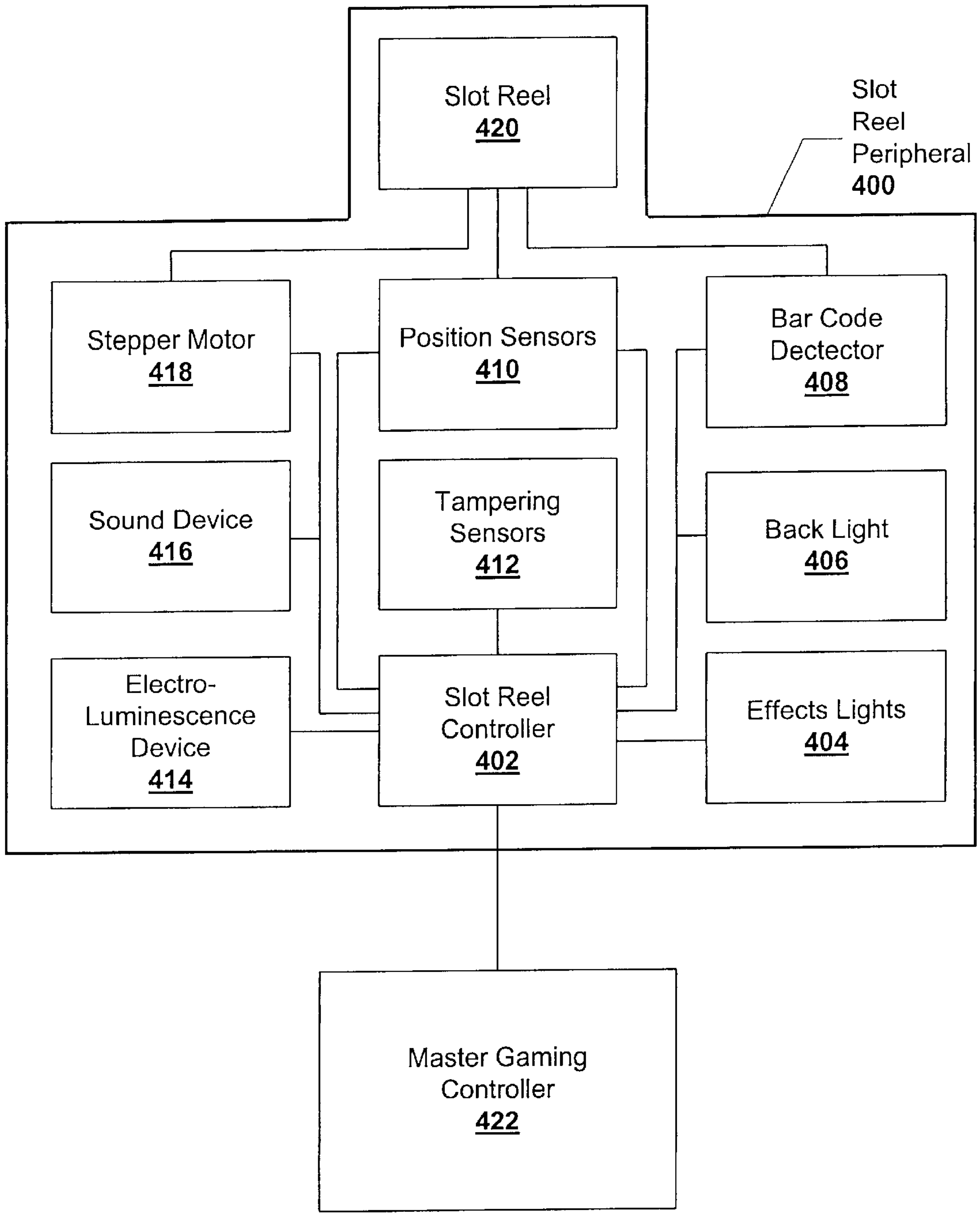
FIG. 4 is a block diagram depicting a more detailed example of a slot reel peripheral in accordance with this invention.

FIG. 4 is a block diagram depicting a more detailed example of a slot reel peripheral in accordance with this invention. The slot reel peripheral 400 may be in communication with a master gaming controller 422 using a standard communication protocol such as USB and an associated connection system which will be described in detail in FIGS. 5, 6, 7, and 8. The slot reel peripheral may contain a number of peripheral devices including an effects light 404, a back light 406, a bar code detector 408, position sensors 410, tampering sensors 412, an electro-luminescence device 414, a sound device 416, a stepper motor 418, and a slot reel 420.

The effects lights 404 may include one or more lights located within the slot reel peripheral 400. These lights may be activated during the course of a game to add to the excitement of the game being played on the gaming machine. In the case where multiple lights are located on the slot reel peripheral, these lights may be activated in various patterns including strobing or flashing. The back light 406 is placed on the slot reel peripheral such that symbols on the reel strip of the slot reel 420 may be easily viewable by a player playing a game on the slot machine. The electro-luminescent device 414 may be a semi-conductor device of some type that may display various patterns depending on the voltage that is applied to the device. For example, an electro-luminescent device 414 might be applied to a reel strip on a slot reel 420 to add additional symbols to reel strip. Depending on the voltage applied to the electro-luminescent device 414, a different symbol might appear at the same location on the reel strip of the slot reel 420. The sound device 416 might be placed on the slot reel peripheral 400 to provide various sound effects during the course of a game on the gaming machine. These sound effects might include the sound of a slot reel making a clicking noise or any other sound patterns which might add to the excitement and interest of the game being played on the gaming machine. The sound device might include a sound projection device of some type including one or more speakers and a sound amplifier to provide power to the sound projection device.

The slot reel 420 is covered with a reel strip which usually displays a number of symbols. For example, a slot reel is shown in FIGS. 1A, 1B, and 1C. When a game is being played on a slot machine, typically, the outcome of the game will be determined by symbols displayed on three or more slot reels located in the gaming machine. Different combinations of symbols may result in different game outcomes. The probability of a particular symbol appearing on a slot reel may be determined by software residing on the master gaming controller 422. When a game is initiated by a player playing a game on the slot machine, the master gaming controller may select a symbol that is to appear on each slot reel. The master gaming controller 422 may then send instructions to the slot reel peripheral 400 through the slot reel controller 402 to initiate a sequence where the slot reel 420 is spun and then stopped at a position corresponding to the symbol selected by the master gaming controller 422.

To verify the symbol displayed by the slot reel 420, the master gaming controller may attempt to determine the position of the slot reel 420 using position sensors 410 or read a bar code corresponding to each symbol using a bar code detector 408. The bar code detector 408 may employ a light sensor of some type to read bar code symbols on the back of the reel strip on the reel 420. Each bar code symbol may correspond to a particular symbol on the reel strip. After reading the bar code symbol, the bar code detector 408 may send this information to the master gaming controller 422 directly or through the slot reel controller 402. The position sensors 420 maybe used to determine where the slot reel has stopped. These sensors may include detectors that monitor the position of the reel and the angular velocity of the reel when it is rotating. Typically, the position sensors are optical sensors. A plastic flag located on the periphery of the reel may pass through the optical sensor which is mounted on the chassis of reel (See FIG. 1C). When the flag passes through the sensor and occludes the light emitting from its emitter, the position of the reel maybe determined. One or more flags may be used with the optical sensor to determine the position of the reel. The information from the position sensors maybe used by the master gaming controller to verify that the slot reel has stopped in the predetermined position and to drive the stepper motor 418.

The motion of the slot reel 420 is controlled by the stepper motor 418 or any other drive mechanism sufficient to move the slot reel from one position to another. Based on parameters of the motor including acceleration constants and the step rate and on parameters of the wheel including the moment of inertia, the stepper motor maybe used to start the slot reel 420 to rotate from an initial non-rotating position, accelerate the slot reel to an angular velocity and then decelerate the slot reel such that it stops at a predetermined position. The stepper motor 420 typically accelerates and decelerates the slot reel in discrete steps. The step rate as a function of time needed to accelerate and decelerate a particular slot reel from an initial position to a final position may reside in the form of a table stored in memory and accessible by software located on the master gaming controller 422 or the slot reel controller 402. This table must match the operational parameters of the slot reel including the moment of inertia When a table is employed that does not correspond to the parameters of a particular slot reel 420, the slot reel may stop at a final position different from the position selected by the master gaming controller 422.

Tampering sensors 412 may be located on the slot reel peripheral 400 to detect attempts to modify the operation of the slot reel peripheral. For example, an attempt to tamper with the slot reels might involve trying to get one or more slot reels on a gaming machine to stop at a position other than the position selected by the master gaming controller 422. This action might be performed to generate a false jackpot. The tampering sensors 412 may operate in conjunction with the bar code detector 408, the positions sensors 410 and the master gaming controller to detect when tampering with the slot reel peripheral 400 may have occurred.

The devices comprising the slot reel peripheral may be controlled directly by the master gaming controller 422 via a series of low-level instructions or indirectly by the master gaming controller via high-level instructions to the slot reel controller 402 which then sends out the low-level instructions. For example, to spin up the slot reel 420 from an initial non-rotating position and then to spin it down to a final position, the stepper motor 418 might require a series of low level instructions including charge the motor, initiate the first step, first delay period, initiate the second step, second delay period, initiate the third step, third delay period, initiate the fourth step, fourth delay period, perform the final step, and stop the motor. When the slot reel is accelerating, the length of time of each delay period between successive steps may decrease. When the slot reel is decelerating the length of time of each delay period between successive steps may increase. The step rate, which is a function of the length of time of each delay period between successive steps, may be based on a table stored in memory corresponding to the particular slot reel. When the master gaming controller directly controls the stepper motor, the master gaming controller would send the series of low-level instructions to the stepper motor. However, with a slot reel peripheral 400 containing a slot reel controller 402, the master gaming controller might send a high-level instruction to the slot reel controller 402 corresponding to a series of low-level instructions for a particular device. The slot reel controller 402 may interpret the high-level instruction and convert it to a series of low-level instructions. For the stepper motor example described above, the low-level commands, charge the motor, initiate first step, step at rate 1, step at rate 2, step at rate 3, step at rate 4, perform final step, and stop the motor, might be initiated by the slot reel controller 402 after receiving a high-level instruction from the master gaming controller 422 like "move the slot reel 420 to position A."

The slot reel controller 402 may convert high-level instructions from the master gaming controller 422 to low-level operational instructions for one or all of the peripheral devices including the effects lights 404, the bar code detector 408, the position sensors 410, the tampering sensors 412, the electro-luminescent device 414, the sound device 416, the stepper motor 418 and any other peripheral device potentially connected to the slot reel peripheral. Some advantages of the slot reel controller 420 performing these operations are that the computational resources needed by the master gaming controller 422 maybe reduced since the slot reel controller, which contains a microprocessor, is performing some operations that could be performed by the master gaming controller. Further, the maintenance required to replace a slot reel might be reduced when a slot reel peripheral is used. For example, a table of step rates is usually required to drive the stepper motor for a particular slot reel. When a new slot reel is installed on a gaming machine and the master gaming controller drives the stepper motor of the slot reel, a table to drive the stepper motor corresponding to the new slot reel maybe loaded into a memory device on the mother board containing the master gaming controller. Further, all the low-level commands and software needed to drive the stepper motor may also be loaded into memory on the motherboard. This process may be very time consuming. Using the slot reel peripheral, most of this information may be contained within the slot reel controller. Thus, the amount of information needed to be installed on the master gaming controller may be minimized when the slot reel peripheral is replaced. Details of the communication protocol and connections needed to implement a slot reel peripheral are described below with reference to FIGS. 5, 6, 7 and 8.

Figure 5:
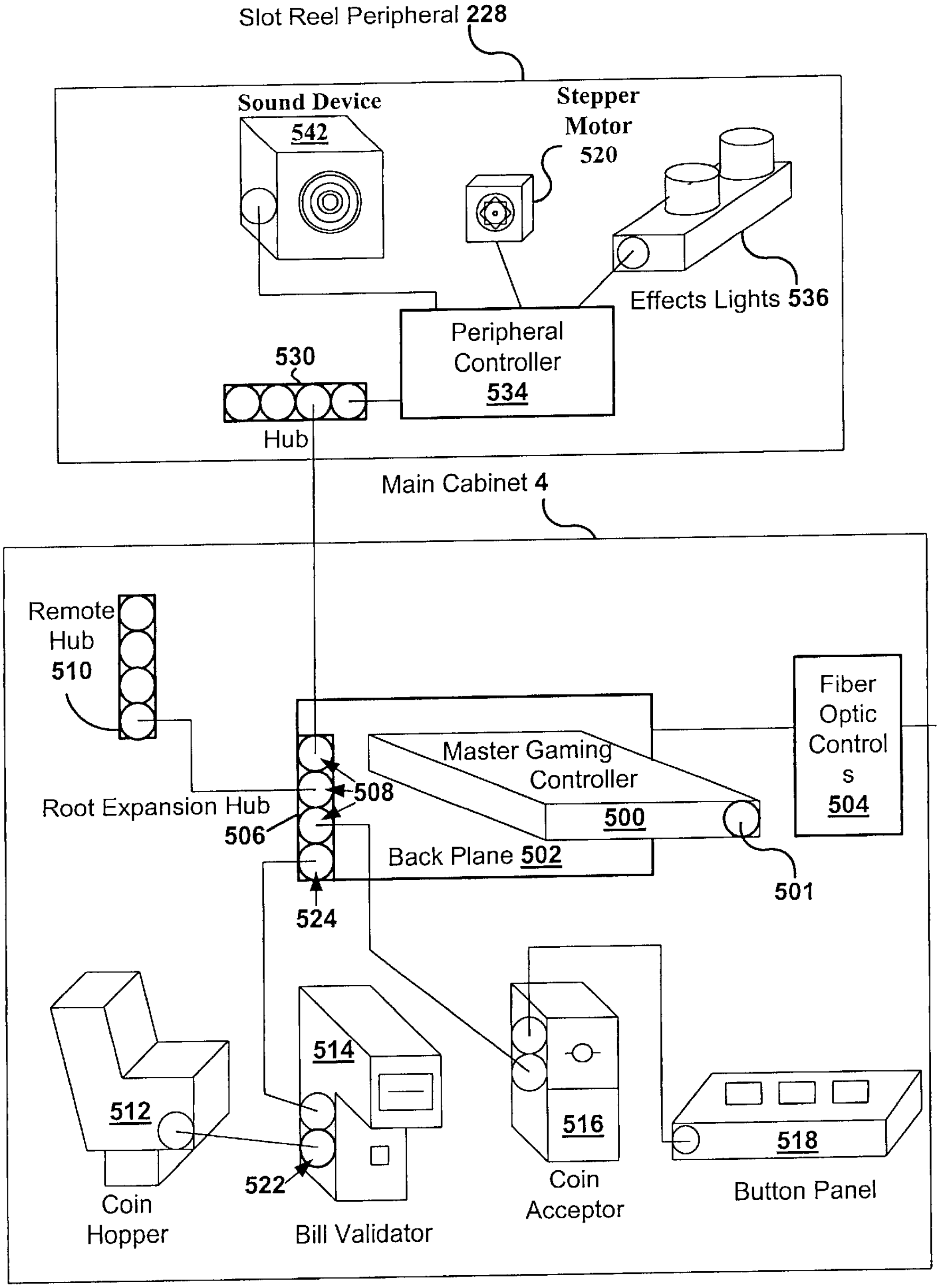
FIG. 5 is a block diagram depicting a slot reel gaming peripheral and its connection to a master gaming controller in accordance with this invention.

FIG. 5 is a block diagram depicting a slot reel peripheral and its connection to a master gaming controller. The master gaming controller 500 shown in FIG. 5 is housed within the main cabinet 4 of the gaming machine 2 shown in FIG. 1A. The master gaming controller 500 controls one or more games played on the gaming machine 2. Typically, the master gaming controller is connected to a motherboard or "back plane" 502, which is attached to the back of the main cabinet 4 of the gaming machine 2. The back plane 502 may include an acceptor (not shown) for mechanically engaging or latching to the master gaming controller 500 and a root expansion hub 506 containing one or more standard communications ports 508. The standard communication ports 508 are used to connect to other devices containing standard communication ports.

The standard communication ports 508, root expansion hub 506, hub 510 and hub 530 and the connections to the devices comprise a communication system that allows the master gaming controller 500 to communicate with devices connected to this system. The devices and the connections shown in the figure are only one embodiment of the present invention. Typically, a device is not required to be plugged into a particular port. Examples of devices, which might be connected to a root expansion hub 506 with standard communication ports 508 on a mother board 502 with a master gaming controller 500, include fiber optic conversion 504, a remote hub 510, a coin acceptor 516, a bill validator 514 and a slot reel peripheral 528. These devices may be housed within the main cabinet 4 of the gaming machine 2 or may reside outside of the main cabinet 4. Other examples of devices which might incorporate a standard communication port 508 that communicate with the master gaming controller 500, include the coin hopper 512, the bill validator 514, the coin acceptor 516, the button panel 518, the effects lights 536, the stepper motor 520, and the sound device 542. These devices might be connected directly to the mother board 502 containing the root expansion hub 506 using one or more of the standard communication ports 508 or through one or more devices containing standard communication ports, which are connected to the root expansion hub 506 on the mother board 502. For example, the coin hopper 512 is connected to a standard communication port 522 on the bill validator 514. The bill validator 514 is connected to the root expansion hub 506 on the motherboard 502 containing the master gaming controller 500.

The root expansion hub 506, which is integrated into the back plane 502, provides breakout connections for devices within the gaming cabinet without requiring additional hardware or non-integrated communication port expansion including the remote hub 510 or the hub 530. Typically, the connections to the root expansion hub 506 are from a connection to a root port within the circuitry of the master gaming controller 500 (i.e., the root port provided by circuitry incorporated into the master gaming controller 500). When the root expansion hub is connected to a root port on the master gaming controller 500, the root expansion hub 506 may be provided with a higher level of security than the other remote hubs including the hubs 510 and 530. In general, any hub can be provided with more or less security than other hubs in the gaming machine. The security for the hub may be provided by limiting access to the interior of the gaming machine using one or more doors with mechanical and/or electrical locking mechanisms. These locks may be monitored by the master gaming controller 500 using sensor devices including electric switches. Further, the ports 508 and 524 within the root expansion hub may have additional security features. For example, access to the ports may be limited using an electronic key or covers with mechanical locks which prevent access. Further, devices connected to these ports may be locked down to prevent the disconnection of a device. Further, electronic or mechanical sensors including evidence tape may be used on a particular port to determine whether a port has been accessed or not. One or more of these security features as well as other security features may be used to secure specific ports on the root expansion hub 506 or any other ports used to connect devices.

Using the standard communication ports 508 and the root expansion hub 506, the master gaming controller 500 may be removed from the acceptor on the mother board which is attached to the back plane 502 without disconnecting or rewiring any of the devices connected to the standard communication ports 508. Also, additional devices may be connected to the root expansion hub 506 on the motherboard 502 without rewiring the motherboard 502 and master gaming controller 500. For example, when the remote hub 510 is disconnected from one of the communication ports 508 on the root expansion hub 506 and replaced with a connection to another device, including but not limited to the slot reel peripheral 528, the coin hopper 512, the bill validator 514, or the coin acceptor 516, then the mother board 502 and the master gaming controller 500 would not need to be rewired.

Also, the standard communication ports in the root expansion hub 506, the hub 510, and the hub 530 may not accept connections to all types of devices to provide additional security. For example, the level of security on the standard communication port 524 might be higher than the other standard communication ports 508 on the root expansion hub 506. Thus, the standard communication port 524 on the root expansion hub 506 might accept connections only from devices requiring a higher level of security including but not limited to the bill validator 514, the coin acceptor 516, and the gaming peripheral 528. In this example, the master gaming controller 500 might not recognize input from the bill validator 514, the coin acceptor 516 or slot reel peripheral 528 unless these devices were connected through a standard communication port with a higher level of security including 524. This security may be provided by mechanical, electronic or software means or combinations thereof For example, port 524 may be housed within a secure locking enclosure to ensure that no one can connect or disconnect through that port without having the necessary key. As another example, the master gaming controller includes a temporary port or hub 501. Usually, this port 501 is used for an electronic key and is used for diagnostics and other secure operations on the master gaming controller. During operation of the gaming machine, a device is not typically connected through this port. Secure ports and data encryption help to meet the necessary security requirements for a gaming machine.

Figure 6:
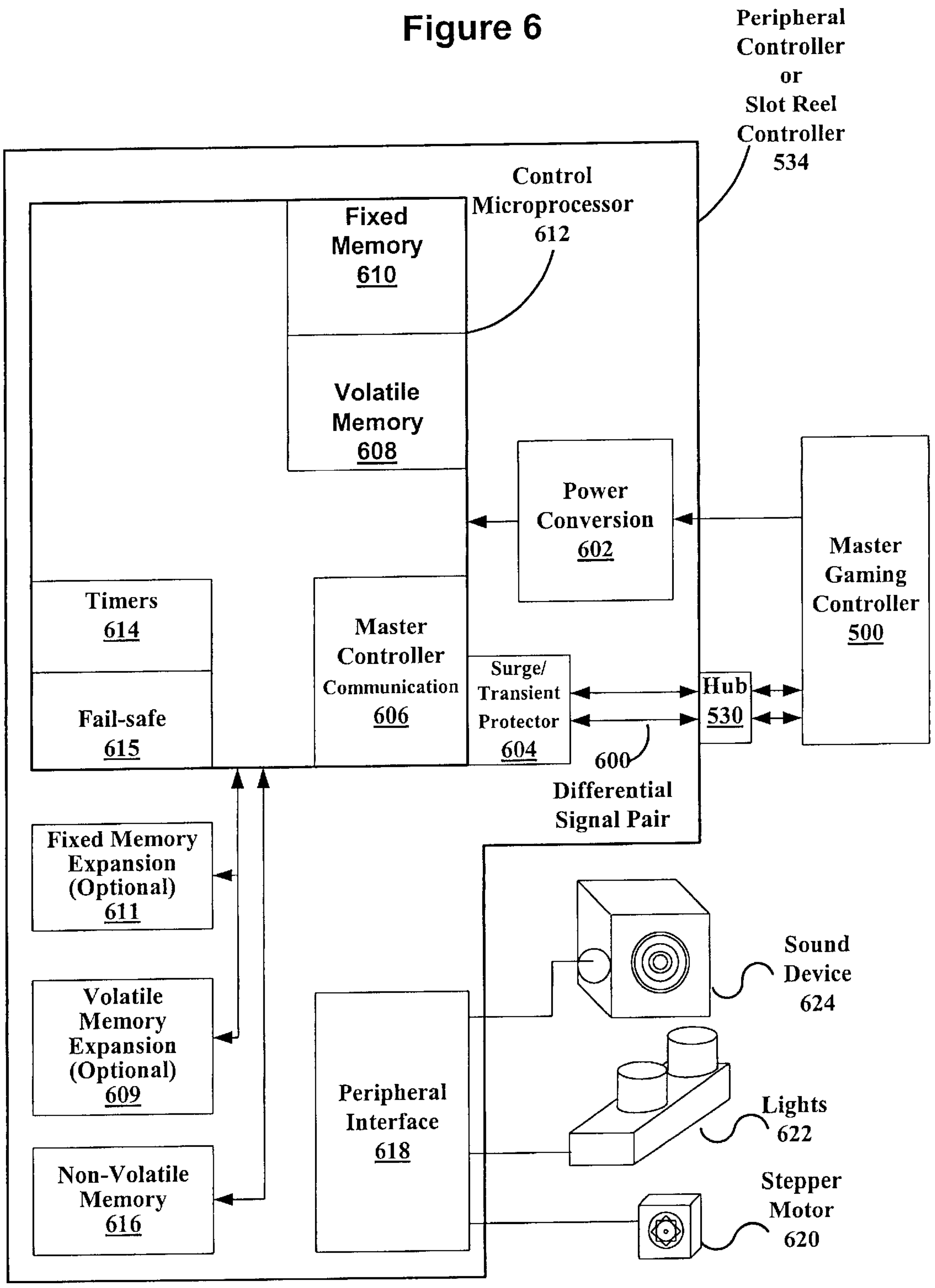
FIG. 6 is a block diagram depicting a more detailed example of a slot reel gaming peripheral in accordance with this invention.
Figure 7:
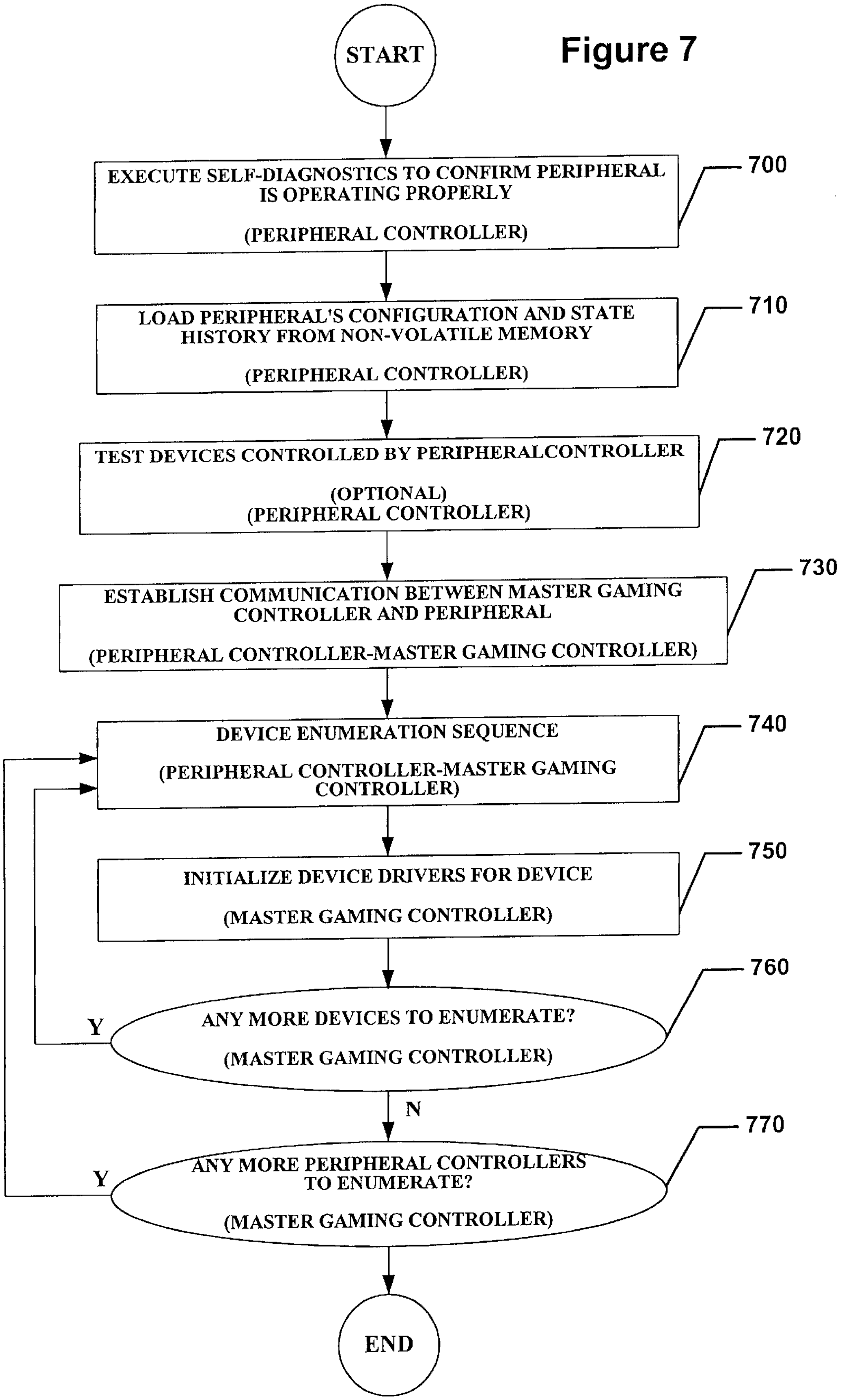
FIG. 7 is a flow diagram depicting the slot reel peripheral power-up and communication process with the master gaming controller.
Figure 8:
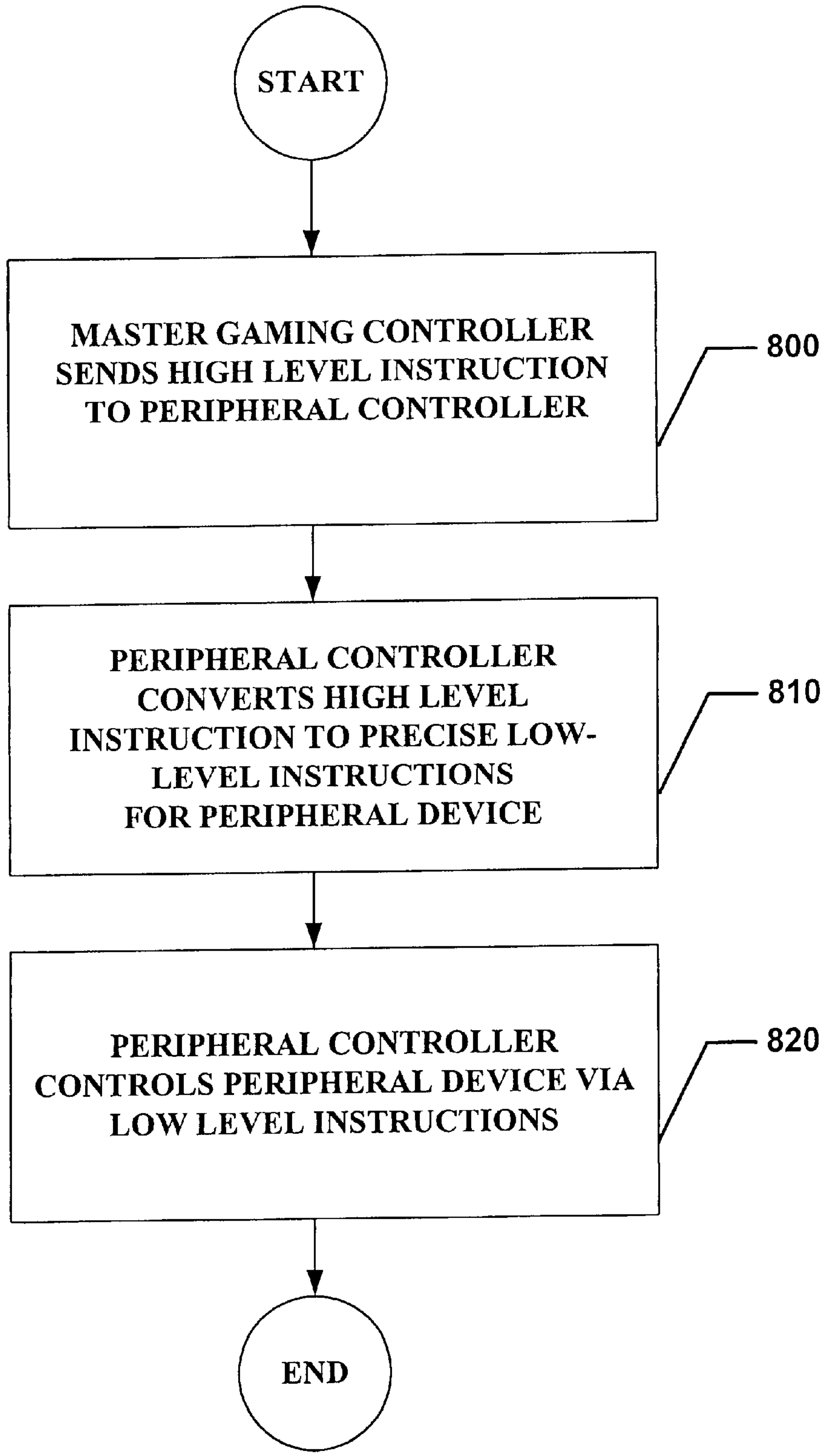
FIG. 8 is a flow diagram depicting the details of a general communication process of a slot reel peripheral device with a master gaming controller.

During the operation of the gaming machine 2, the master gaming controller 500 communicates with devices connected through the system of standard communication ports and connections. The master gaming controller 500 includes a memory storing software for executing a standard communication protocol that allows communication with the various devices using the standard communication connections. This communication protocol may include encryption capability for communicating with one or more devices. The master gaming controller 500 communicates with devices to obtain information about a device including whether it is operating properly or whether it is still connected. In FIGS. 6, 7, and 8, this communication process is described in more detail.

During a game, the master gaming controller 500 controls devices. Using the standard communication connections and the standard communication protocol, the master gaming controller 500 may send instructions to a device to perform a specific operation. These instructions may be in the form of low-level or high-level instructions. The master gaming controller 500 sends low-level instructions to devices that it directly controls. Examples of low-level instructions might include turing on a specific light, turning off a specific light, starting a motor, or stopping a motor. The master gaming controller may send high-level instructions to the slot reel peripheral 528. A slot reel peripheral 528 is a device that contains, for example, a hub 530 with standard communication connections, a peripheral controller or slot reel controller 534, and connections to one or more peripheral devices. Typically, the peripheral controller controls one or more peripheral devices. Also, when the communication connections and the standard communication protocol are used, the peripheral controller 534 enables communication between the master gaming controller 500 and one or more peripheral devices. Examples of some peripheral devices, which might be included as part of slot reel peripheral 528, are the effects lights 536, the stepper motor 538, the sound device 542, in FIG. 5 and the back light 406, the bar code detector 408, the position sensors 410, the tampering sensors 412, and the electro-luminescent device 414 in FIG. 4. The peripheral controller 534 controls the peripheral devices connected to the peripheral controller 534 including the effects lights 536, the stepper motor 538, and the sound device 542. When the master gaming controller 500 sends the high-level instruction to the slot reel peripheral 528 requesting an operation from a peripheral device controlled by the peripheral controller 534, the peripheral controller 534 receives a high-level instruction and converts it to the low-level instructions specific to the operation requested from the master gaming controller 500. For example, the master gaming controller 200 might send a high-level instruction to the slot reel peripheral 528 to "strobe" its lights 536. The peripheral controller 534 would receive this high-level instruction and send out a series of low-level instructions to the lights 536 including instructions to turn on and off specific lights at specified intervals. The high-level instruction set that allows the master gaming controller 500 to operate a peripheral device on a gaming peripheral 528 with a peripheral controller 534 is stored as device driver software on a memory device on the master gaming controller 500.

To present a primary game play on a gaming machine with slot reels, the master gaming controller 500 may typically send instructions that direct the operation of three or more slot reel peripherals 528. As an example, the master gaming controller may send instructions to three slot reel peripherals requesting that each of the three slot reel peripherals present a cherry symbol representing the outcome of a primary game play on the gaming machine. Each slot reel peripheral 528 may be modular such that one or more of the slot reel peripherals 528 can be disconnected from its standard communication connection without disconnecting other slot reel peripherals that act together to present a primary game play. As an example, a single slot reel peripheral 528 may be disconnected from a gaming machine with three slot reel peripherals for maintenance and replaced with another slot reel peripheral.

FIG. 6 is a block diagram depicting a more detailed example of a slot reel peripheral in accordance with this invention. The master gaming controller 500 is connected to the hub 530, which includes standard communication connections on the slot reel peripheral. The peripheral controller 534 is connected to the hub 530 using a peripheral connection 600. The peripheral connection 600 is connected to a transient and surge protector 604. The transient and surge protector 604 protects the peripheral controller from signals arriving on the peripheral connections, which might damage a control microprocessor 612.

Power from the master gaming controller 500 is transmitted to a power conversion unit 602. The power conversion unit 602 converts the voltage arriving from the master gaming controller 500 to voltages needed for the control microprocessor 612 of the peripheral controller 534 or any of the peripheral devices connected to the peripheral controller 534 including but not limited to the stepper motor 620, the effects lights 622 or the sound device 624. The peripheral devices may also receive power directly from the power supply unit (not shown) with or without using the power conversion unit 602. The power supply unit is usually contained within the main cabinet of the gaming machine.

Hardware needed to connect the slot reel controller or peripheral controller 534 to a specific peripheral device is located in the peripheral interface 618. At least one or more peripheral devices are connected to the peripheral interface 618. These peripheral devices may include the stepper motor 620, the effects lights 622, the sound device 624, slot reel, back light bar code detector, tampering sensors, positions sensors and electro-luminescent The configuration of the peripheral controller 534, which includes information about the types of peripheral devices controlled by the peripheral controller 534, is stored in a non-volatile memory 616. When the peripheral devices on a slot reel peripheral are changed, the non-volatile memory 616 can be replaced or reprogrammed to incorporate the new configuration.

The peripheral controller contains a control microprocessor 612 that controls communication with the master gaming controller 500. Further, the control microprocessor 612 converts high-level instructions from the master gaming controller 500 requesting specific operations from the peripheral devices controlled by the peripheral controller 534 to low-level instructions needed to perform the operation. In one embodiment the control microprocessor 612 includes a fixed memory 610, a volatile memory 608, a timer 614, a fail-safe 615, and a master controller communication 606. In other embodiments, either the fixed memory 610 or the volatile memory 608 or both may be located outside of the control microprocessor.

The volatile memory 608 and fixed memory 610 may be upgraded using the volatile memory expansion 609 and the fixed memory expansion 611. The fixed memory expansion 611 might be in the form of an EPROM or flash memory. When flash memory is used, it may be possible to field upgrade the operating code of the peripheral controller. The volatile memory expansion 609 might be in the form of static RAM, which uses a long-life battery to protect the memory contents when power is removed.

In a preferred embodiment each slot reel peripheral containing a peripheral controller 534 contains an essentially identical control microprocessor 612. In such modular designs, the power conversion circuitry 602 and surge/transient protector circuitry will also be essentially identical from peripheral to peripheral. The only distinctions between peripheral controllers in individual peripherals will reside in the peripheral interface 618 and the information stored in non-volatile memory 616. This allows for rapid design and reduced maintenance of gaming machine peripherals.

Within the control microprocessor 612, the master controller communication 606 controls the communication between the peripheral controller 534 and the master gaming controller 500. The control microprocessor may be an off-the-shelf device including an Infineon Technologies C541U family of microcontrollers. The master controller communication 606 performs the communication using a standard communication protocol. Essentially, it implements the protocol associated with a standard communications protocol such as USB, IEEE1394, or the like. The timer 614 sends signals to the control microprocessor 612, which controls execution of code. The fail-safe 615 contains code, which is independent of the code in the control microprocessor 612. When code within the control microprocessor 612 is lost or malfunctions, the fail safe 615 will reset the entire slot reel peripheral. As an example, the fail safe 615 might expect a message from the control microprocessor 612, which includes "do not reset." When the fail safe 615 receives this message, the fail safe 615 will wait a specified interval for the next "do not reset" message. When the fail safe 615 does not receive a message including "do not reset" after a specified interval, the fail safe 615 resets the slot reel peripheral.

The fixed memory 610 is a read only memory, which is not lost when the control microprocessor 612 loses power. The fixed memory 610 stores general code that the control microprocessor 612 uses while operating. The code stored in the fixed memory 610 maybe identical in every peripheral controller 534. To control a specific peripheral device, the control microprocessor 612 uses code stored in the fixed memory 610 in conjunction with peripheral device specific information stored in the non-volatile memory 616. The volatile memory 608 stores code, parameters, data from the peripheral devices and data from the master gaming controller 500 that the control microprocessor 612 needs to operate. The data in volatile memory 608 is lost when the control microprocessor 612 loses power. Critical information including the current state of peripheral devices is stored in the non-volatile memory 616. The non-volatile memory might be an EEPROM, flash card memory or a battery powered RAM. In the event of a power failure or some other malfunction, the information in non-volatile memory 616 is used to restore the slot reel peripheral to its state before the malfunction occurred. For example, when a player enters cash into the gaming machine 2 and initiates a game, the current position of the slot reel can be stored in non-volatile memory 616 on the peripheral controller 534. After this information is stored in non-volatile memory, it will be available to determine the state of the machine 2 when any subsequent malfunctions occur.

FIG. 7 is a flow diagram depicting an example of the slot reel peripheral power-up and communication process with the master gaming controller. This process is described for one slot reel peripheral. For a plurality of slot reel peripherals, this process is implemented for each slot reel peripheral. When a slot reel peripheral loses power, which may include an accidental power loss or planned maintenance for the slot reel peripheral, the process in FIG. 7 is usually followed. When a slot reel peripheral first receives power, the standard control microprocessor, as an example see 612 in FIG. 6, executes self-diagnostics to confirm the peripheral is operating properly in block 700. The control microprocessor will load software stored in its fixed memory. With this software the control microprocessor will execute a series of self-diagnostics to determine that its various components are operating properly. These tests may include testing the processor, timer, fail safe and master communication controller functions of the control microprocessor.

After the control microprocessor completes its self-diagnostics in block 700, the slot reel peripheral's configuration and state history is loaded into the control microprocessor's volatile memory from non-volatile memory outside of the control microprocessor in block 710. The non-volatile memory stores information about the peripheral devices that are connected to the control microprocessor through the peripheral interface. This information tells the standard control microprocessor what type of slot reel peripheral it is controlling. The control microprocessor loads the information stored in the non-volatile memory and loads code stored in the control microprocessor's fixed memory into volatile memory on the control microprocessor to operate the peripheral devices. In FIG. 6, the control microprocessor 612, the volatile memory 608, the fixed memory 610, the non-volatile memory 616, and the peripheral interface 618 are one possible embodiment of the hardware needed to implement the process in block 710. One possible example of configuration information, which might be stored in non-volatile memory, is information describing the effects lights connected to the slot reel peripheral. The non-volatile memory might store information including the type of effects lights, the number of lights, the response time of the lights, the signal needed to turn the lights on, the signal needed to turn the lights off, the communication rate and the communication buffer size for the effects lights. As another example, the non-volatile memory might store configuration information for a stepper motor connected to the slot reel peripheral, this information might include the type of motor, the signal needed to turn the motor on, the signal needed to turn the motor off, the response time of the motor, the communication buffer size and the communication rate for the stepper motor.

In block 710, the control microprocessor loads the state history of the slot reel peripheral from the non-volatile memory. The state history includes game information that describes states of the peripheral devices of a slot reel peripheral that occur while a game is being played on a gaming machine. For example, state information stored in the non-volatile memory might include the status of the tampering sensors, the position of reels or the status of effects lights. When a gaming machine loses power or malfunctions during a game, the information stored in the non-volatile memory is used to restore the gaming machine to the state in the game that occurred just before the power loss or malfunction. In general, when a gaming machine is being powered-up, the slot reel peripheral will initialize itself to a pre-determined "safe" state until the master controller connects to it. When communication is established between the slot reel peripheral and master gaming controller, the control microprocessor may attempt to transfer relevant state history information it has retrieved from its nonvolatile memory to the master gaming controller.

In block 720, after self-diagnostics and initializing itself to some state, the peripheral controller may test the peripheral devices that it controls. This step is optional. Examples of some tests the peripheral controller might execute include turning effects lights on and off on a light panel, advancing the stepper motor, determining the position of the reel, or projecting a sound pattern from a speaker.

In block 730, the peripheral controller establishes communication between the slot reel peripheral and the master gaming controller. Using the standard communication connections and the standard communication protocol, the peripheral controller establishes communication with the master gaming controller. One embodiment of the hardware needed for this communication process between the peripheral controller and the master gaming controller is shown in FIG. 6. One example of the initial communication sequence and data exchange between the peripheral controller and master gaming controller can be represented as a series of high-level questions. A typical sequence to establish communication might proceed as a message from the master gaming controller including "is anyone there?" The peripheral controller might respond, "yes" and the master gaming controller might ask, "what type of device are you?" Then, the peripheral controller might respond, "I am a slot reel peripheral of some type." To this question, the master gaming controller might respond, "what is your communication rate and buffer size?" The peripheral controller would send this information to the master gaming controller and the devices would continue to communicate. The questions described above are representative of the type of information that is passed between devices using a standard communication protocol. The actual information passed by the devices corresponding to the questions will be specific to the particular protocol.

There are many different standard communication protocols including USB or IEEE1394, and the like. Each of these protocols utilizes a standard communication sequence. But the standard communication sequence may vary depending on the type of protocol that is used. When the master gaming controller is using a USB protocol to communication over the standard communication, the following information or a portion of this information might be exchanged between the master gaming controller and peripheral controller: 1) release specification number, 2) device class, 3) subclass (e.g. version) 4) device communication protocol and revision, 5) Maximum receive and send packet sizes, 6) vendor identification, 7) product identification, 8) device release number, 9) manufacturer string, 10) product string, 11) device descriptor, 12) device protocol, 13) serial number, and 14) number of configuration interfaces. The USB standard is widely-known and described in various references such as *USB Hardware and Software*, John Garney, Ed Solari Shelagh Callahan, Kosar Jaff, Brad Hosler, published by Annabooks 11838 Bernado Plaza Court, San Diego, Calif., 92128, copyright 1998, ISBN 0-929392-37-X, which is incorporated herein by reference for all purposes.

After establishing communication with the slot reel peripheral, the master gaming controller queries the slot reel peripheral for peripheral devices. This process is called the device enumeration sequence in block 740. One or more peripheral devices attached to the slot reel peripheral may communicate with the master gaming controller or may be controlled by the master gaming controller during the course of a game. In this step, the master gaming controller requests device information from the peripheral controller. Again, the information exchange between the master gaming controller and peripheral controller can be represented as a series of high-level questions. The format of the information exchange may vary depending on the communication protocol being used. As an example, the first question from the master gaming controller to the peripheral controller might be "do you have any devices?" When the slot reel peripheral replies "yes", the master gaming controller might ask "what is the device?" The peripheral controller will then send information to the master gaming controller, in some format or protocol established before the communication process began, as to the type of peripheral device. This device identification protocol is distinct from the communication protocol.

For certain devices requiring a higher level of security including but not limited to bill validators and coin acceptors, the master gaming controller might determine which port it is using. Using the device identification protocol and the port information, the master gaming controller may or may not communicate with the slot reel peripheral. It may issue an error message and prevent further operation if the device is not using a required port. As a specific example, the master gaming controller may require that an electronic key (e.g., a software dongle) be inserted into to a port prior to operation of that port (as a security measure). When a peripheral device is subsequently connected into the port where an electronic key has been used, the master gaming controller may only communicate with certain types of devices that are allowed access into this port based on the information provided by the electronic key.

In block 750, the master gaming controller initializes one or more selected device drivers for the peripheral device identified in block 740. Using a device identification number or some other system for identifying the peripheral device, the master gaming controller selects a software device driver, which will operate the features of the peripheral device enumerated in block 740. The master gaming controller first searches for a software driver, which exactly corresponds to the peripheral device. When the master gaming controller can not locate a software driver who exactly corresponds to the peripheral device, the master gaming controller may search for a similar software driver that might operate all or some of the features of the peripheral device. Examples of peripheral devices on a slot reel peripheral which might be operated by a master gaming controller using a software driver include effects lights, sound devices, stepper motors, position sensors, bar code detectors, back lights, tampering sensors and electroluminescent devices. After choosing a software driver, the master gaming controller makes the software available for use. Usually, this is done by loading the software into memory. When a software driver can not be located for a particular peripheral device, the master gaming controller does not operate this device during the game. When the peripheral device without a software driver is critical for operation of the gaming machine, the master gaming controller may generate an error message.

In block 740, to select the software driver, the master gaming controller may use a device identification protocol. As an example, the device identification protocol might include a series of numbers which correspond to a specific peripheral device. As an example, combinations of the device class, manufacturer, device protocol and serial number information from a particular device might be used. From these numbers, the master gaming controller would be able identify the type of the peripheral device and its features. Related peripheral devices with similar features might have similar numbers. For example, two versions of a peripheral device, device A and device B might share in common one or more numbers including 11112 to denote device A and 11113 to denote device B. This is similar to the concept of an address mask in network technology. This selection process may vary depending on the peripheral's manufacturer and the driver implementation.

In block 760, the master gaming controller determines whether the device enumeration sequence is completed. When more devices need to be enumerated, the master gaming controller returns to block 740. In block 760, the master gaming controller might determine whether more devices need to be enumerated by querying the peripheral controller or the master gaming controller might know the number of peripheral devices connected to the slot reel peripheral by its type. The type of the slot reel peripheral was identified when communication was established in block 730. In block 770, when the enumeration process is completed for all the peripheral devices connected to a peripheral controller, the master gaming controller may look for additional peripheral devices connected to other peripheral controllers to enumerate and return to block 740. For example, the master gaming controller may repeat the enumeration procedure for each slot reel peripheral on the gaming machine. When all of the peripheral devices connected to all the peripheral controllers are enumerated, the process shown in FIG. 7 is complete.

One advantage of the enumeration and device driver initialization process in blocks 740, 750, 760 is that enumeration may occur at any time while the machine is running. For example, when lights connected to the slot reel peripheral are not functioning, the lights could be removed from the slot reel peripheral for repair and replaced with a new set of lights while the gaming machine is running and the master gaming controller might unenumerate the old lights and then enumerate the new lights. Potentially, the power-up and communication process in FIG. 7 might be carried out by the master gaming controller without intervention by an attendant or other maintenance person.

FIG. 8 is a flow diagram depicting some details of the communication with a peripheral device on a slot reel peripheral via a standard peripheral interface in block 505 in FIG. 5. In the power-up phase described in FIG. 7, the master gaming controller establishes communication with the slot reel peripheral and selects software drivers for the peripheral devices the master gaming controller can operate. In block 600, the master gaming controller may use the software driver to send the peripheral controller on the slot reel peripheral a high-level instruction that requests the operation of a specific feature of the peripheral device. This high-level instruction is sent using the standard communication connection hardware and the standard communication protocol. A possible hardware embodiment of this process was shown in FIG. 5. For effects lights, examples of a potential high-level instructions might include "strobe lights", "flash lights", "implement light pattern A", or "implement light pattern B". For a stepper motor, examples of potential high-level instructions might include "apply power to the motor ", "advance ten step at 4 steps per second", or "stop motor." Further high-level instructions might be sent to other types of peripheral devices including bar code detectors, back lights, sound devices, electro-luminescent devices, position sensors, or slot reels. In block 610, the peripheral controller receives a high-level instruction for a peripheral device and converts the high-level instruction into to one or more low-level instructions that are needed to perform the specific operation on the peripheral device. For example, a high-level instruction from the master gaming controller to "strobe lights" on a effects light panel with 3 lights connected to the slot reel peripheral might be converted to a sequence low-level instructions including "turn on light 1", "wait 100 milliseconds," "turn off light 1", "turn on light 2," "wait 100 milliseconds", "turn off light 2", "turn on light 3." In block 620, the peripheral controller or slot reel controller sends the device specific low-level instructions through the peripheral interface to the peripheral device. The sequence of low-level instructions sent from the peripheral controller allows the peripheral device to perform the operation requested by the master gaming controller.

Although the foregoing invention has been described in some detail for purposes of clarity of understanding, it will be apparent that certain changes and modifications maybe practiced within the scope of the appended claims. For instance, while the gaming machines of this invention have been depicted as having accessible slot reel peripherals physically attached to a main gaming machine cabinet, the use of gaming devices in accordance with this invention is not so limited. For example, the devices commonly provided on a top box may be included in a stand alone cabinet proximate to, but unconnected to, the main gaming machine chassis.

What is claimed is:

1. A slot reel peripheral comprising:
- a slot reel assembly comprising:
  - a drive mechanism;
  - a single slot reel that is moved from position to position by the drive mechanism;
  - a peripheral controller that directly controls the drive mechanism; and
  - a peripheral communications connection for connecting the peripheral controller to a master gaming controller.

2. The slot reel peripheral of claim 1 wherein the drive mechanism is a stepper motor.

3. The slot reel peripheral of claim 1, further comprising one or more peripheral devices also controlled by the peripheral controller.

4. The slot reel peripheral of claim 3, wherein the peripheral device is an effects light, a position sensor, a bar code detector, a back light, a tampering sensor, a stepper motor, a sound device or an electro-luminescent device.

5. The slot reel peripheral of claim 3 further comprising a peripheral interface that directly connects to the one or more peripheral devices.

6. The slot reel peripheral of claim 5, wherein the peripheral controller includes a memory storing software for a communication protocol that allows communication with the peripheral devices via the peripheral interface.

7. The slot reel peripheral of claim 1, further comprising a hub connected to the peripheral communications connection and containing a plurality of peripheral communications connections.

8. The slot reel peripheral of claim 1, wherein the peripheral controller includes a control microprocessor that controls communication over the peripheral communications connection.

9. The slot reel peripheral of claim 1, wherein the peripheral controller includes a non-volatile memory arranged to store at least one of a) configuration parameters specific to the slot reel peripheral, b) state history information of the slot reel peripheral.

10. The slot reel peripheral of claim 9, wherein the non-volatile memory stores configuration parameters needed to drive the slot reel using the drive mechanism including a moment of inertia of the slot reel, a size of the slot reel and one or more acceleration parameters.

11. The slot reel peripheral of claim 1, wherein the peripheral controller is configured to communicate with a plurality of other slot reel peripherals.

12. The slot reel peripheral of claim 1, wherein the slot reel peripheral is modular and can be disconnected from the master gaming controller without disconnecting other slot reel peripherals that act together with the slot reel peripheral to present a primary game play.

13. A gaming machine comprising:
- a master gaming controller that controls one or more games played on the gaming machine; and
- at least one slot reel peripheral, each slot reel peripheral comprising:
  - a slot reel assembly comprising:
    - a drive mechanism;
    - a single slot reel that is moved from position to position by the drive mechanism;
    - a peripheral controller that directly controls the drive mechanism; and
    - a peripheral communications connection connecting the peripheral controller to the master gaming controller.

14. The gaming machine of claim 13, wherein the gaming machine is a video slot machine.

15. The gaming machine of claim 13, wherein the master gaming controller includes a memory storing software for a standard device identification protocol for at least some of the slot reel peripherals.

16. The gaming machine of claim 13, wherein the master gaming controller includes a memory storing one or more device drivers for the at least one slot reel peripheral.

17. The gaming machine of claim 13, wherein the master gaming controller includes a memory storing software for a communication protocol that allows communication with the at least one slot reel peripheral via the peripheral communications connection.

18. The gaming machine of claim 13, wherein the slot reel peripheral includes a memory storing software for a communication protocol that allows communication with the master gaming controller via the peripheral communications connection.

19. The gaming of claim 13, wherein the slot reel peripheral is configured to receive high-level instructions from the master gaming controller that do not specify precise control of the drive mechanism of one of the slot reel peripherals, and wherein the peripheral controller of the one of the slot reel peripherals provides low-level instructions precisely controlling the operation of its drive mechanism and following the high-level instructions.

20. The gaming machine of claim 13, wherein a first slot reel peripheral is configured to communicate high-level instructions that do not specify precise control of the drive mechanism of a second slot reel peripheral, and wherein the peripheral controller of the second slot reel peripherals receiving high-level instructions from the first slot reel peripheral provides low-level instructions precisely controlling the operation of its drive mechanism and following the high-level instructions.

21. The gaming machine of claim 13, wherein the gaming machine includes at least three slot reel peripherals acting together to present a game play.

22. A gaming machine network comprising;

(a) a slot reel peripheral comprising;
  a slot reel assembly comprising:
    one or more drive mechanisms;
    one or more slot reels moved from position to position by the one or more drive mechanisms;
    a peripheral communications connection; and
    a peripheral controller that directly controls the drive mechanism; and (b) a plurality of gaming machines each gaming machine comprising;
  a master gaming controller that controls the slot reel peripheral; and
  a peripheral communication connection configured to communicate with the slot reel peripheral.

23. The gaming machine network of claim 22, wherein the slot reel peripheral is configured to receive high-level instructions from the plurality of master gaming controllers that do not specify precise control of the one or more drive mechanisms of the slot reel peripheral, and wherein the peripheral controller of the slot reel peripheral provides low-level instructions precisely controlling the operation of its one or more drive mechanisms and following the high-level instructions.

24. The gaming machine network of claim 22, wherein the gaming machine is a video slot machine.

25. A method for controlling operation of a slot reel peripheral on a gaming machine, the slot reel peripheral containing (i) a single slot reel, (ii) a peripheral controller, (iii) a standard peripheral communications connection for connecting the peripheral controller to a master gaming controller and (iv) one or more peripheral devices, the method comprising:

receiving a high level instruction for controlling the slot reel peripheral from a first master gaming controller via the standard peripheral communications connection to the peripheral controller, wherein the high level instruction does not precisely specify how the slot reel peripheral must perform an operation associated with the high level instruction;

converting the high level instruction to one or more low level operating instructions with the peripheral controller controlling operation of the one or more peripheral devices with the peripheral controller and the one or more low level operating instructions.

26. The method of claim 25, wherein one or more of the peripheral devices are selected from the group consisting of an effects light a position sensor, a bar code detector, a back light, a tampering sensor, a stepper motor, a sound device or an electro-luminescent device.

27. The method of claim 25, further comprising storing state history information in the slot reel peripheral, said state history information specifying a recent operating state of the slot reel peripheral;

transmitting the stored state history information to the first master gaming controller.

28. The method of claim 25, further comprising receiving a high level instruction for controlling the slot reel peripheral from a second slot reel peripheral via a standard peripheral connection.

29. The method of claim 25, further comprising receiving a high level instruction for controlling the slot reel peripheral from a second master gaming controller via a standard peripheral connection said second master gaming controller different from said first master gaming controller.

30. A slot reel peripheral comprising:

a slot reel assembly comprising:
  a drive mechanism;
  a single slot reel that is moved from position to position by the drive mechanism;
  a peripheral controller that directly controls the drive mechanism; and
    a Universal Serial Bus (USB) communications connection for connecting the peripheral controller to a master gaming controller.

31. A gaming machine comprising:

a master gaming controller that controls one or more games played on the gaming machine; and at least one slot reel peripheral, each slot reel peripheral comprising:
  a slot reel assembly comprising:
    a drive mechanism;
    a single slot reel that is moved from position to position by the drive mechanism;
    a peripheral controller that directly controls the drive mechanism; and
    a Universal Serial Bus (USB) communications connection connecting the peripheral controller to the master gaming controller.

32. A method for controlling operation of a slot reel peripheral on a gaming machine, the slot reel peripheral containing (i) a single slot reel, (ii) a peripheral controller, (iii) a Universal Serial Bus (USB) peripheral communications connection for connecting the peripheral controller to a master gaming controller and (iv) one or more peripheral devices, the method comprising:

receiving a high level instruction for controlling the slot reel peripheral from a first master gaming controller via the USB peripheral communications connection to the peripheral controller, wherein the high level instruction does not precisely specify how the slot reel peripheral must perform an operation associated with the high level instruction;

converting the high level instruction to one or more low level operating instructions with the peripheral controller controlling operation of the one or more peripheral devices with the peripheral controller and the one or more low level operating instructions.

* * * * *